United States Patent [19]
Morrison

[11] Patent Number: 5,438,353
[45] Date of Patent: Aug. 1, 1995

[54] CLOCK SIGNAL GENERATOR FOR ELECTROPHOTOGRAPHIC PRINTERS

[75] Inventor: Robert D. Morrison, Star, Id.

[73] Assignee: Hewlett-Packard Company, Palo Alto, Calif.

[21] Appl. No.: 969,913

[22] Filed: Nov. 2, 1992

[51] Int. Cl.$^6$ .............................................. G01D 9/42
[52] U.S. Cl. ..................................... 347/250; 358/409
[58] Field of Search ................ 346/108, 160; 358/296, 358/298, 409, 410; 347/129, 250, 235

[56] References Cited

U.S. PATENT DOCUMENTS

| | | | |
|---|---|---|---|
| 4,677,292 | 6/1987 | Shimada | 358/410 |
| 4,796,095 | 1/1989 | Shimada | 358/410 |
| 5,014,137 | 5/1991 | Shimada | 358/410 |
| 5,081,477 | 1/1992 | Gibson | 346/160 |

OTHER PUBLICATIONS

*An Introduction to Computer Logic* by H. Troy Nagle et al., Copyright 1975 (pp. 228-229).

*Primary Examiner*—Peter S. Wong
*Assistant Examiner*—Randy W. Gibson

[57] ABSTRACT

A new and improved method and system for controlling the timing of a modulation input signal utilized for driving a laser engine of a laser or electrophotographic printer. This method and system utilizes a novel modulation generator circuit which operates to receive both a beam detect signal from the laser driver circuit and an asynchronous clock signal from the output of an asynchronous clock generator. The modulation generator in turn operates to delay the output signal from the asynchronous clock generator a predetermined number of times and then select the delayed clock signal which is closest in phase to the phase of the beam detect signal. Then this clock generated signal is used to set the modulation frequency of a bi-phase output digital clock signal from the modulation generator which is applied as input timing signal for video input data applied to laser driver circuit and used for developing images on a photoconductive drum.

5 Claims, 5 Drawing Sheets

CLOCK SIGNAL GENERATOR FOR ELECTROPHOTOGRAPHIC PRINTERS

TECHNICAL FIELD

This invention relates generally to electrical systems for applying video input data to electrophotograhic or laser print engines and more particularly to such a system having an improved control over the timing of laser beam video input data applied to the photoconductive drum of a laser printer to thereby improve the overall print quality of the developed images.

BACKGROUND ART

In the operation of electrophotographic or laser printers, it is a standard procedure to use a so-called "beam detect" signal derived from a laser print engine to control the timing or start at which each successive line of video input data is applied to the laser print engine. This beam detect signal is derived from a photodetector which is located and focused with respect to the edge of the photoconductive drum across which the laser beam is swept so as to detect the start of each successive video line scanned. The beam detect signal is picked up by the photodetector and then synchronized to an asynchronous clock signal which is used to set the modulation frequency for the video data being applied to the laser engine.

The problem with using the above approach is that since the beam detect signal is synchronized to an asynchronous clock, the phase of the asynchronous clock signal is not necessarily the same phase as the beam detect signal, and this fact, in turn, produces a phenomenon in the printed image which is known in the art as "jitter". This jitter is produced by not precisely spacing dots on each successive printed line with respect to the dots spaced on each previously printed and successively printed line. It is the solution to this problem to which the present invention is directed.

DISCLOSURE OF INVENTION

The general purpose and principal object of the present invention is to provide a new and improved method and system for eliminating the above described jitter and thereby in turn significantly improving the print quality of the printed image output of the electrophotographic or laser printer. To accomplish this purpose and object, there has been developed a novel method and system for controlling the precise timing of the input video data applied to the laser engine to ensure the precise placing of printed dots on each successive line of data written onto a photoconductive drum of a laser printer. This method and system include, among other things, the generation of a beam detect signal representative of the location of a scanned laser beam within a laser printer and the utilization of the beam detect signal to in turn generate a clock signal which is of the same phase as the beam detect signal. This clock signal is then in turn used to drive the laser print engine, so that the dots of data written on successive lines of a photoconductive drum are precisely placed and aligned with respect to each other.

In a preferred embodiment of this invention, the above described phase locking method includes the steps of: delaying an asynchronous clock signal a given number of times to produce a plurality of delayed clock signals differing in phase from one another, and then comparing a beam detect signal to the plurality of delayed clock signals and thereby selecting the delayed clock signal which is the closest or equal in phase to the phase of the beam detect signal. Then, the selected delayed clock signal is utilized to control the timing of video input data which is applied to a laser print engine to control the laser beam scan frequency thereof.

Among the many of the novel features of this invention is included the use of a plurality of cascaded inverter stages which are operative to receive an asynchronous clock signal to generate a corresponding plurality of delayed clock signals which are then compared in a snapshot latch circuit to the beam detect signal to thereby select the delayed clock signal which is closest to the phase of the beam detect signal. Output signals from the snapshot latch circuit are then applied as input data to a combination differentiating circuit and a select and encoder latch circuit. A single output signal from this latter circuitry is then applied to an output multiplexer circuit which is operative to generate output CLOCK and $\overline{\text{CLOCK}}$ timing signals for controlling video input data to a laser print engine.

Another novel feature of this invention is the provision of a clock generator for producing CLOCK and $\overline{\text{CLOCK}}$ bi-phase output timing signals for use in controlling video data in an electrophotographic printer including, in combination: a chain of serially connected inverters for receiving an input clock signal and generating a plurality of variably delayed clock signals; a snapshot latch stage having a plurality of bistable flip flops therein, each of which are connected to receive a beam detect signal and a different variably delayed clock signal from one of the inverters; a differentiator stage connected to the flip flops in the snapshot latch stage and operative to generated a single output signal indicative of the phase of the beam detect signal; and, an output mulitplexer stage connected to the differentiator stage and operative for comparing the single output signal with a selected one of the variably delayed clock signals in the chain of serially connected inverters and generating the bi-phase clock signals, whereby the selected one clock signal is closest in phase to the phase of the beam detect signal.

The above brief summary of the invention, together with its many other novel features and advantages will become better understood with reference to the following description of the accompanying drawings.

DETAILED DESCRIPTION OF THE DRAWINGS

Figure 1A:
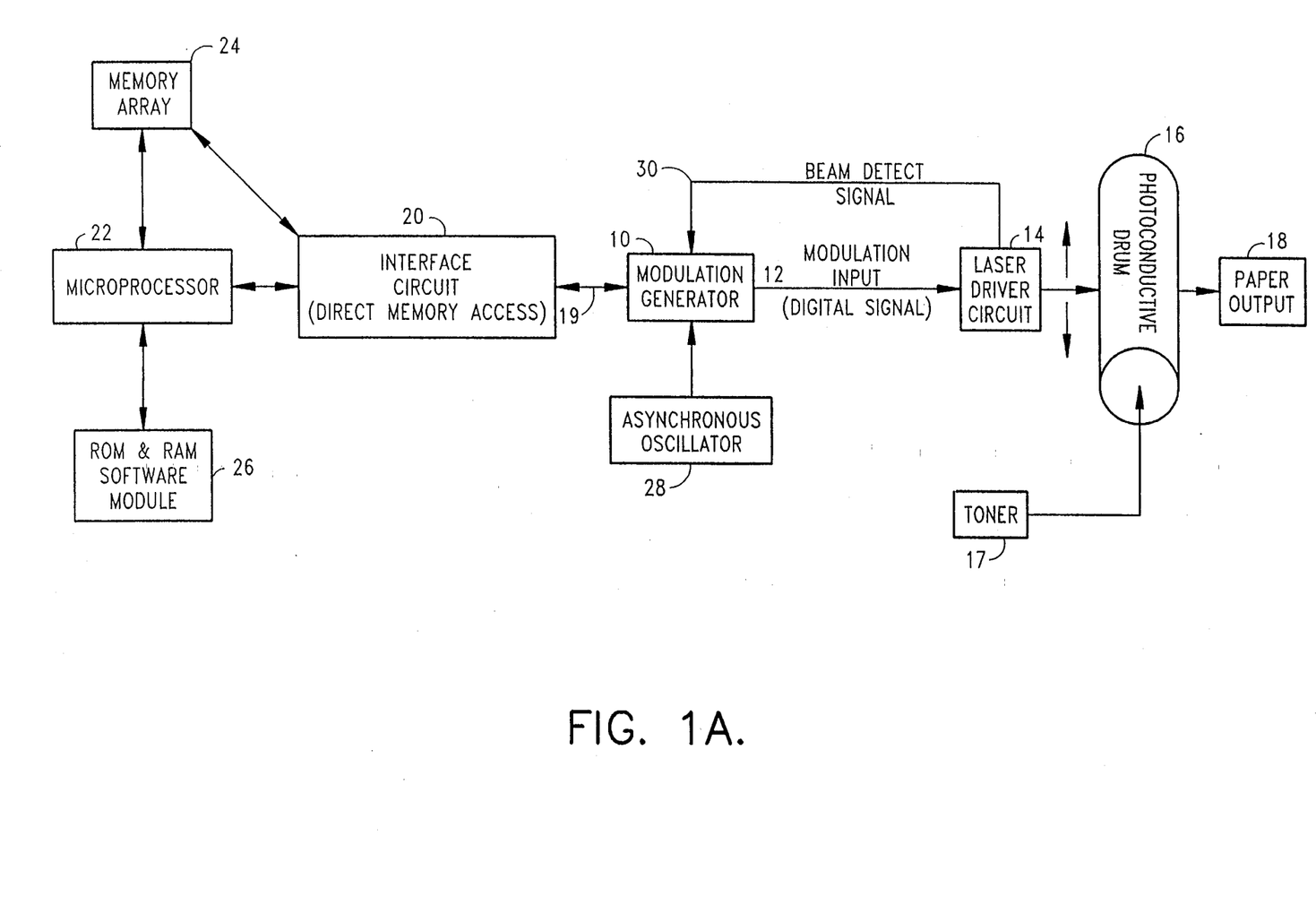
FIG. 1A is a functional system block diagram of a read/write electrical system in which the present invention is an integral art.

Referring now to FIG. 1A, the read/write signal processing system shown therein includes a modulation generator 10 which has been constructed in accordance with the present invention and produces a modulated input digital signal on line 12 which is applied to a laser driver circuit 14 of conventional construction. The laser driver circuit 14 is connected in a well-known and conventional manner to drive a laser diode (not shown) which is part of the laser drive circuit 14. This laser diode in turn writes images on a photoconductive drum 16 supplied with toner 17 to thereby produce printed paper output in an output paper handling stage 18.

The modulation generator 10 is connected as shown to send and receive information via the two-way connection 19 to and from a direct memory access (DMA) interface circuit 20, and the connection 19 is an eight (8) bit parallel bus interface of known construction. The DMA interface circuit 20 in turn sends and receives information both to and from a microprocessor 22 and to and from a memory array 24. The microprocessor 22 also sends and receives information to and from a read only memory (ROM) and random access memory (RAM) software module 26. The connection, construction, and operation of all of the above described stages 20, 22, 24, and 26 to the left of the modulation generator 10 as viewed in FIG. 1A are generally well known in the art and are therefore not described in detail herein.

The ROM and RAM software module 26 is used to load data into the microprocessor 22, and the microprocessor 22 in turn is used to load the memory array 24 with data for high speed reading and in a particular format. For high speed reading applications as is well known, the direct memory access interface circuit 20 reads data directly from the memory array 24 at a very high rate of speed which is much higher than the operational speed of the microprocessor 22. In these high speed reading applications, the microprocessor 22 is by-passed by the direct connection between the memory array 24 and the direct memory access interface circuit 20.

The operating frequency of the modulation generator 10 is set by the frequency of the asynchronous oscillator or clock 28 which will operate typically in the range of 40 MHz, and herein with a specific frequency of 40.5889 MHz. As described in more circuit detail below, the modulation generator 10 compares the phase of the clock signal received from the asynchronous oscillator 28 with the phase of a beam detect signal received by way of line 30 from the laser drive circuit 14 which has been previously buffered and amplified. This operation in turn produces a 40.5889 MHz digital signal on line 12 which is identical in phase (or as close as possible) to the phase of the beam detect signal on line 30.

Figure 1B:
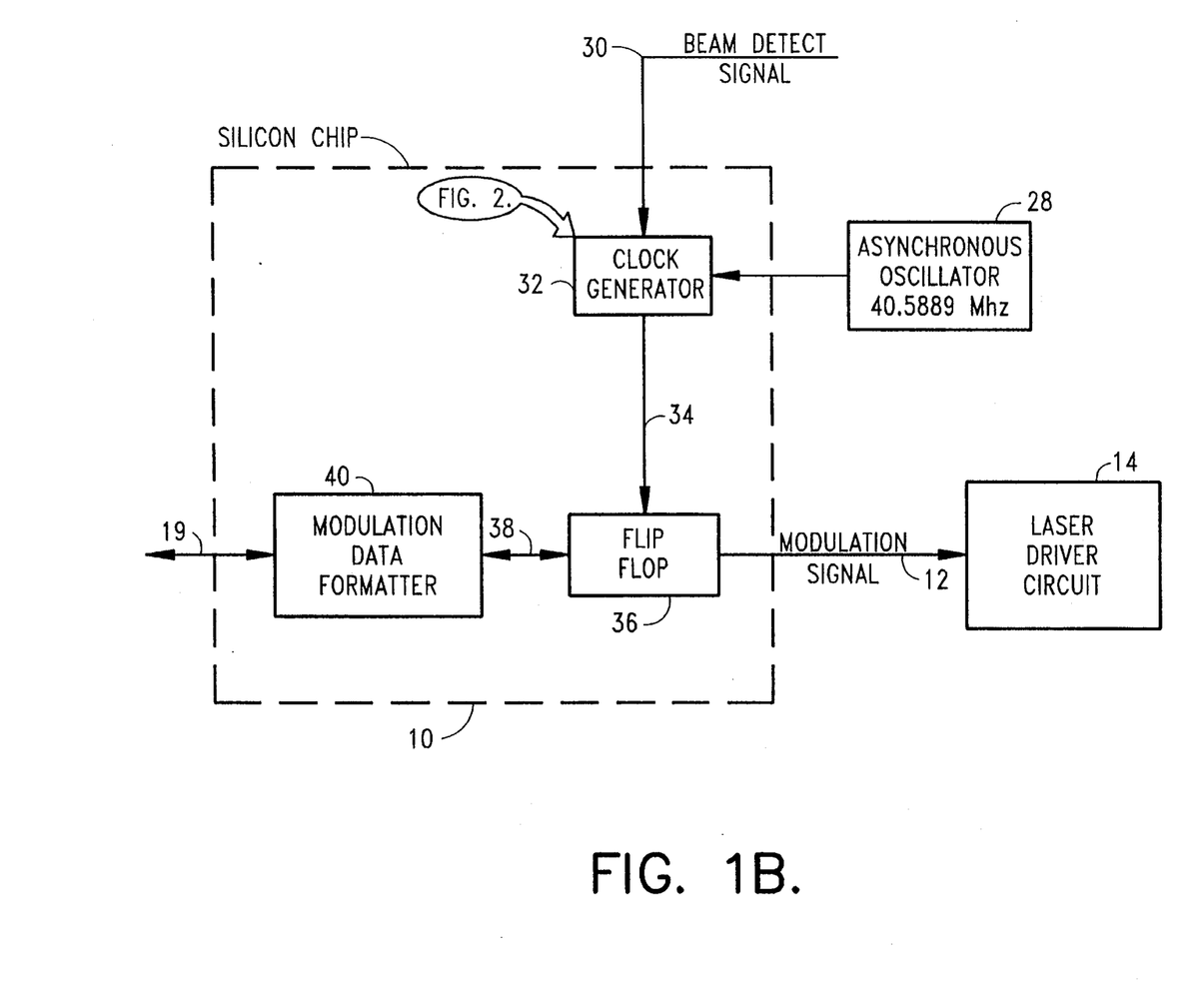
FIG. 1B is a functional block diagram showing the clock generator, modulation data formatter, and flip-flop stages of the modulation generator stage of FIG. 1A, as well as the input connections thereto.

Referring now to FIG. 1B, the modulation generator 10 contains therein a clock generator 32 which is connected in accordance with the novel teachings and principles of the present invention to receive both the beam detect signal on line 30 from the laser driver circuit 14 in FIG. 1A and the input clock signal from the asynchronous oscillator 28. The clock generator will then in turn generate an output signal on line 34 which is applied to an output flip-flop stage 36. The output flip-flop stage 36 will in turn generate a digital bi-phase output modulation signal on line 12 which is applied to the laser drive circuit 14. The clock generator stage 32 is shown in greater detail in FIGS. 2 and 3 herein and described below.

The clock generator stage 32 operates to generate two bi-phase clocks on the output line represented functionally as a single line 34 in FIG. 1B, but in fact representative of CLOCK and $\overline{\text{CLOCK}}$ signals on lines 50 and 52 shown in FIGS. 2 and 3 below. These two bi-phase clocks control the output video transition edges which ultimately control the start of each video dot of laser printed text or graphics. The first clock 50 aligns evenly oriented dots printed on the photoconductive drum 16, whereas the second clock 52 aligns the odd oriented dots of video information.

The video information referred to above is applied to the flip-flop 36 by way of a connection 38 from a conventional modulation data formatter stage 40. The modulation data formatter stage 40 is in turn connected to the previously described 8 bit parallel bus 19 which is connected back to the direct memory access interface circuit 20 previously described. Thus, the clock generator 32 provides input signals on line 34 which determine the CLOCK and $\overline{\text{CLOCK}}$ windows in time in which the flip-flop 36 is operative to pass video data from line 38 and as input information signals to the laser drive circuit 14. The clock generator 32, the flip-flop 36, and the modulation data formatter 40 have all been constructed monolithically on a single silicon chip 10 and identified by the silicon chip legend in FIG. 1B.

Figure 2:
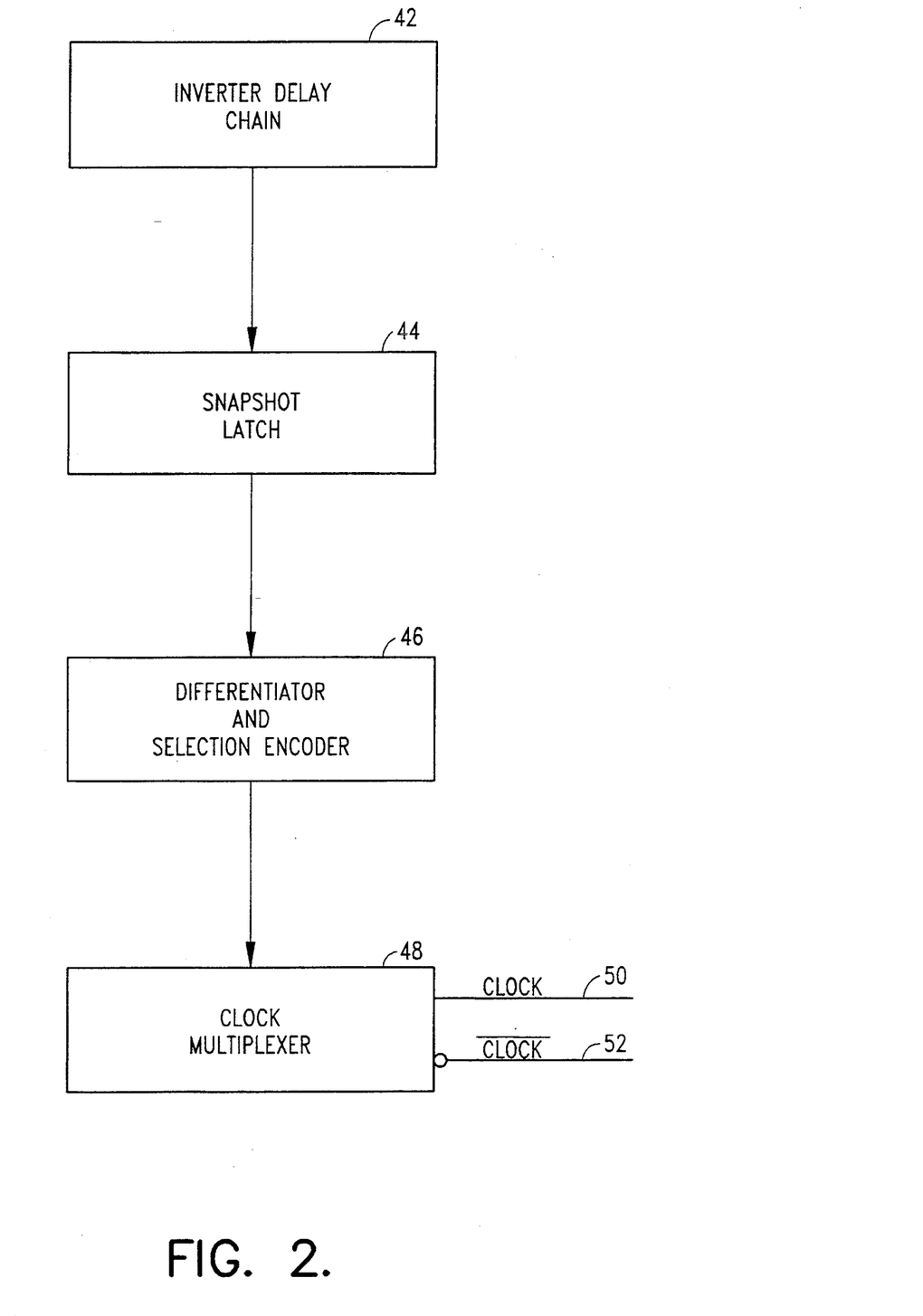
FIG. 2 is a specific functional block diagram of the clock generator of FIG. 1B.

Referring now to FIG. 2, the functional block diagram shown in this figure is broken down into the four major stages which define the clock generator 32 in FIG. 1B. These major stages include a delay chain of inverters 42 having their outputs connected to a snapshot latch stage 44. The snapshot latch stage 44 is in turn connected to drive a differentiator and selection encoder stage 46, and outputs of the differentiator and selection encoder stage 46 are in turn connected to drive a clock multiplexing (MUX) stage 48. Thus, CLOCK and $\overline{\text{CLOCK}}$ outputs 50 and 52 are provided at the output lines of the clock multiplexing stage 48 and are utilized to provide the timing data for controlling the laser drive circuit 14.

As described in more detail below, the delay chain of inverters 42 is connected to receive the 40.5889 MHz clock input from the previously identified asynchronous oscillator 28 shown in both FIGS. 1A and 1B above which sets the operating frequency for driving the laser drive circuitry 14. The beam detect signal is applied to the snapshot latch stage 44 and is utilized to match the phase of the 40.5889 MHz clock input to stage 42 with the phase of the beam detect signal applied as a feedback input via line 30 to the previously described modulation generator 10. The latch stage 44 has bistable logic therein described in detail below which is connected to receive both variably delayed clock signals from the inverter chain and the beam detect signal to generate a phase change output signal which in turn is applied to the differentiator circuit. This phase change output signal is processed through the differentiator stage and into the output multiplexer circuit wherein it enables one of the variably delayed clock signals to in turn generate bi-phase output clock timing signals for controlling a laser drive circuit of a laser printer.

Figure 3:
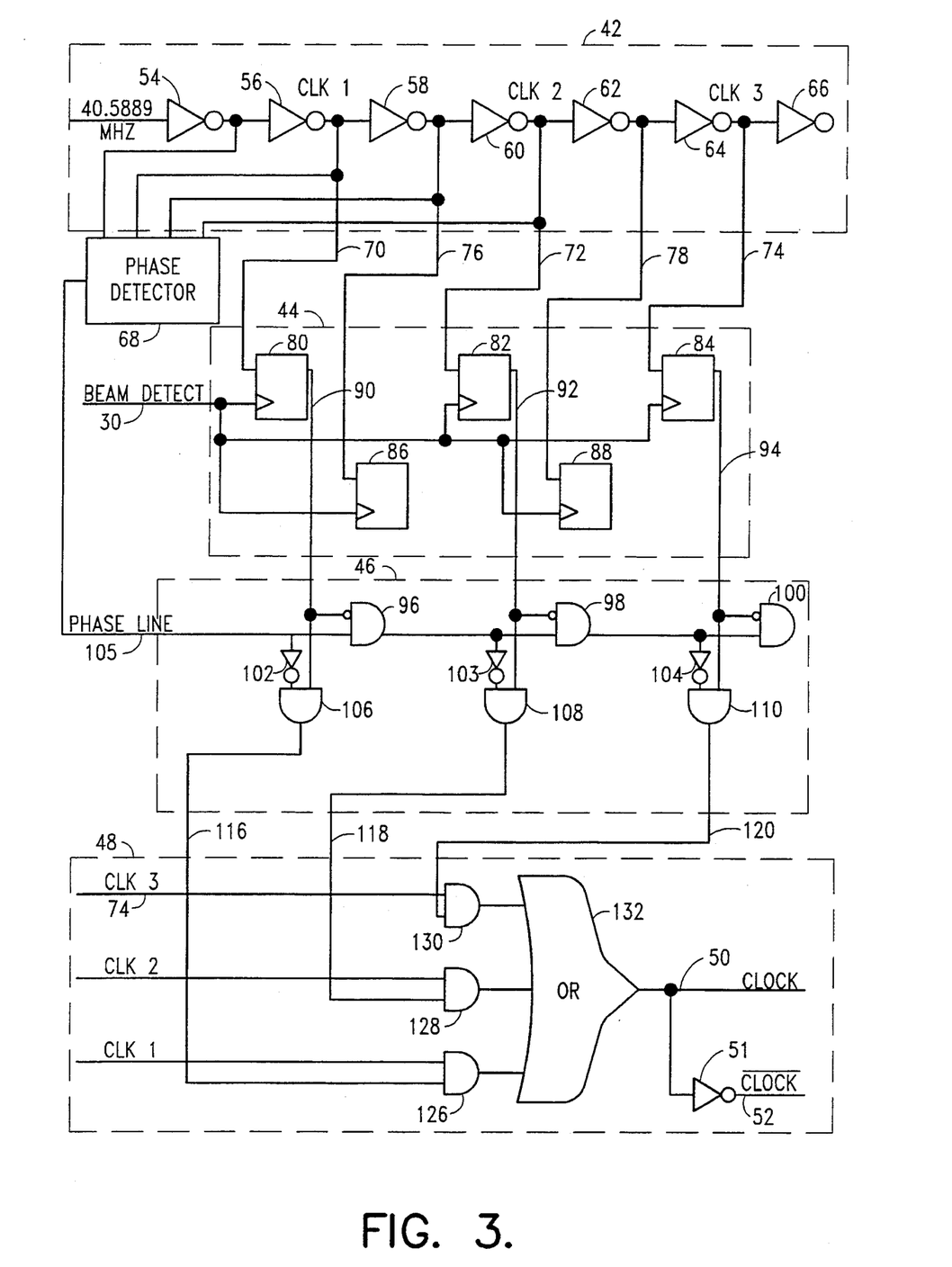
FIG. 3 is a circuit schematic diagram which is used to explain the phase control and delayed clock signal selection operation of the clock generator shown in FIG. 2.

Referring now to FIG. 3, the inverter delay chain 42 contains a plurality of series connected inverter stages 54, 56, 58, 60, 62, 64, and 66, the input inverter input stage 54 of which is connected to receive the 40.5889 MHz clock input. Each of the first four inverter stages 54, 56, 58, and 60 are connected as shown at their outputs to a phase detector 68 which is operative in a manner described in more detail below. Every other inverter stage, e.g., 56, 60, and 64, is designated as generating delayed clocks CLK1, CLK2, CLK3, and so on out to CLKN clock signals which are applied, by way of example herein, to a corresponding plurality of input connection 70, 72, and 74, etc. to the snapshot latch stage designated generally as 44. Then, the alternate inverters 58, 62, and so on are connected by way of the alternate lines 76 and 78 as additional inputs to the snapshot latch stage 44 which is connected to receive the beam detect signal as an input on line 30 from the laser drive circuitry 14.

The snapshot latch stage 44 comprises a first upper plurality of flip-flop stages 80, 82, and 84 and a second lower plurality of flip-flop stages 86 and 88, with each of these flip-flops having one input terminal connected to receive the beam detect signal on line 30. The first plurality of upper flip-flop stages 80, 82, and 84 are connected to receive the non-inverted and delayed clock signals CLK1, CLK2, and CLK3 as input signals respectively on lines 70, 72, and 74, whereas the plurality of lower flip-flop stages 86 and 88 are likewise connected to receive inverted delayed clock signals at the outputs of the inverter stages 58 and 62 and via input connection 76 and 78, respectively. The lower flip-flop stages 86 and 88 operate identical to the upper flip-flop stages 80, 82, and 84, so that, for sake of simplicity, only the function of the upper flip-flop stages 80, 82, and 84 will be described herein in their response to both the beam detect signal on line 30 and in response to the non-inverted and differently delayed clock signals CLK1, CLK2, and CLK3 at the outputs of the alternate inverters 56, 60, and 64, respectively, in the inverter delay chain 42.

The function of the upper series of flip-flops 80, 82, and 84 as well as the lower series of flip-flops 86 and 88 is to look on lines 70, 72, and 74 for the first change of phase in the delay chain 42 as seen on lines 70, 72, and 74. If any of the inverter stages 56 through 66 in the inverter chain 42 fails to exhibit such a change in phase of the clock signals at the output of these inverter stages, then the corresponding flip-flop 80, 82, 84, etc. will propagate a carry signal via each of its output lines 90, 92, and 94 and thereby operate to prevent an output signal to be generated from the differentiator and selection encoder circuit 46 which is fed by these plurality of flip-flop output lines 90, 92, 94, etc. from the plurality of upper flip-flop stages 80, 82, and 84.

However, if any one of the flip-flops 80, 82, and 84 in the upper flip-flop chain sees a phase change in the clock signals on line 70, 72, and 74, respectively, then a corresponding output signal will be generated on its corresponding output line 90, 92, and 94 and cause an output signal to be generated by the differentiator and selection encoder circuit 42. For this condition, further carry signals from these switched flip-flops are not generated, thereby enabling further flip-flop stages in a given flip-flop chain to generate an output signal. As previously indicated, the output lines 90, 92, and 94 from the upper series of flip-flop stages 80, 82, and 84 are connected to a differentiator and selection encoder stage 46. However, an additional differentiator and selection encoder stage (not shown) is connected in a like manner to the lower series of flip-flops in the flip-flop chain 86 and 88, of which these flip-flops 86 and 88 are only two in a much longer chain of flip-flops in the lower flip-flop series of the snapshot latch 44.

The differentiator and selection encoder stage 46 comprises a group of serially connected AND gates 96, 98, and 100 and a corresponding group of parallel connected AND gates 106, 108, and 110, respectively. The differentiator stage 46 operates such that the particular gate 106, 108, or 110 which receives a clock signal closest in phase to the beam detect signal will generate a corresponding output signal on one of the output lines 116, 118, or 120 and then applied via these output connections to a clock multiplexer (MUX) stage 48.

The clock multiplexer stage 48 includes therein a plurality of output AND gates 126, 128, and 130 which are connected, respectively, to the output lines 116, 118, and 120 from the differentiator and selection encoder stage 46. These output AND gates 126, 128, and 130 are further connected, respectively, to also receive clock signals CLK1 through CLKN as a second input to each of these output gates. Therefore, when the first change of phase condition from a zero to a one, for example, and propagates on one output line 120 from the AND gate 110 is seen by the output gate 130, then this change of phase signal is "anded" to its corresponding input clock signal CLK3 from the output of one of the inverters 64 in the inverter delay chain 42. This in turn causes the output gate 130 to be the first gate to generate a clock signal output, thereby indicating that this clock signal output is the closest in phase of the phase to the beam detect signal applied on line 30 to the snapshot latch stage 44. This operation is described in more detail below.

The principal purpose of the phase detector 68 which is connected as shown to the outputs of the first four inverter stages 54, 56, 58, and 60 in the inverter delay chain 42 is to generate either a one or zero on the phase line 105. This one or zero is applied as shown as an input to each of the three series connected AND gates 96, 98, and 100 and also through the inverters 102, 103, and 104 as one input to each of the parallel connected AND gates 106, 108, and 110 in the differentiator and selection encoder stage 46. If, for example, the phase on line 105 is zero, then you want to look for the first flip flop in the chain of flip flops 80, 82, and 84 which is different from zero. In other words, one. Typically, in a long chain of flip flops 82 and 84, etc., only three of which are shown in FIG. 3, a first number of these flip flops will be zero, then a next series of flip flops (not shown) will be one, and then a following next series of flip flops in a line of flip flops will be zero again. The object is to identify the first flip flop in a long chain 80, 82, and 84, etc. which is an output phase on the lines 90, 92, and 94 which is different from zero, or different from the phase of the detected signal on the phase line 105.

Thus, the function of the differentiator and selection encoder circuit 46 is to compare the phase on the phase line 105 from the phase detector 68 to the phase condition on lines 90, 92, and 94, and then generate a single output from one of the parallel connected AND gates 104, 108, and 110 which are applied by way of output lines 116, 118, and 120, respectively, to the clock multiplexer stage 48. This one signal which will be generated on one of the output lines 116, 118, and 120 will indicate that the output of a particular inverter 56, 60, and 64 in our example shown in FIG. 3 has undergone a change in phase immediately after the occurrence of the beam detect signal which is applied as one input to each of the series of flip flops 80, 82, 84, etc. This triggering of only one of the parallel connected AND gates 106, 108, 110 must occur only on the first time that the above phase change occurs within the inverter chain 42 and only on the first time. Thus, in operation, the snapshot stage 44 will take a picture or snapshot of the phase of the 40.5889 MHz signal immediately after beam detect and then delayed by the series connected inverters to a time later and later after the time of beam detect. Thus, the snapshot stage 44 operates to find the particular delayed clock signal in the inverter chain 42 which is changing in phase closest in point of time to the time of occurrence of the beam detect signal on line 30.

The function of the differentiator circuit 46 is then to take this snapshot information from the snapshot stage 42 and find the first change of phase clock on one of the output lines 90, 92, and 94 which first occurs after a change of the digital signal from a one to a zero or from a zero to a one on the phase line 105 and then as soon as possible after the occurrence in time of the beam detect signal on line 30. The way this is accomplished is by a signal propagating scheme and ripple effect carried out in the series connected AND gates 96, 98, and 100 in the differentiator and selection encoder stage 46. These AND gates 96, 98, and 100 will operate to propagate the enable carry signals described above and generated by the flip flops 80, 82, and 84 and appearing on their output lines 90, 92, and 94. Each successive stage or AND gate 96, 98, and 100 will prevent the generation of an output signal only if there has been no change of state in the corresponding previous flip flop stage 80, 82, and 84.

Thus, once the differentiator stage 46 has generated an output from one of the parallel connected AND gates 106, 108, and 110, the above ripple carry scheme utilizing the series connected AND gates 96, 98, and 100 will prevent the generation of any further output from any of the following parallel connected AND gates 106, 108, and 110. If the above ripple carry scheme is in effect (that is, when no phase changes have been detected) and in addition there is a phase change on one of the output lines 90, 92, and 94 from the snapshot logic stage 40, then a selected one of the parallel connected AND gates 106, 108, and 110 will generate a single output which will then determine the particular clock signal CLK1, CLK2, CLK3, CLKN selected for the time duration until the next beam detect signal occurs on line 30 at the input to the snapshot logic stage 44, whereupon the above process repeats itself all over again.

Let us assume, for example, that the flip flop 84 above in snapshot logic stage 44 is the first flip flop to change state after beam detect, thereby generating an output signal on line 120 as one input to the upper parallel connected AND gate 130 within the clock multiplexer stage 48. The upper AND gate 130 in combination with the lower two AND gates 126 and 128 provide a three input logic stage into an output OR gate 132 which will generate a clock signal of CLOCK and $\overline{\text{CLOCK}}$ on lines 50 and 52. Once the snapshot has been taken by the snapshot logic stage 44, and a decision has been made by the circuitry in FIG. 3 that CLK3 is to be selected as the clock signal having a phase closest to the phase of the beam detect signal, then CLK3 becomes the clock source for the eventual output from the OR gate 132.

Thus, the enable signal on line 120 occurs shortly after beam detect occurrence, thereby enabling the upper AND gate 130 to be conditioned for the subsequent occurrence and time of CLK3 at the output of the inverter 64 to propagate through the AND gate 130, through the OR gate 132 and utilized as an output signal on the output CLOCK and $\overline{\text{CLOCK}}$ lines 50 and 52, and passing through the inverter 51 as shown. As previously indicated, this clock selection of CLK3 is then utilized by the laser drive circuitry 14 in FIG. 1 until such time that the next beam detect signal comes along and the above process repeats itself all over again. The actual time that the clock signal CLK3 is passed through the upper AND gate 130 is controlled by the first time after the occurrence of a signal on line 120 that CLK3 undergoes a change in phase to match the phase, or as closely thereto as possible, of the phase of the signal on line 120. At this time, CLK3 will be "anded" through the upper AND gate 130 and on through the OR gate 132 to generate the CLOCK and $\overline{\text{CLOCK}}$ signals on the output lines 50 and 52.

Figure 4A:
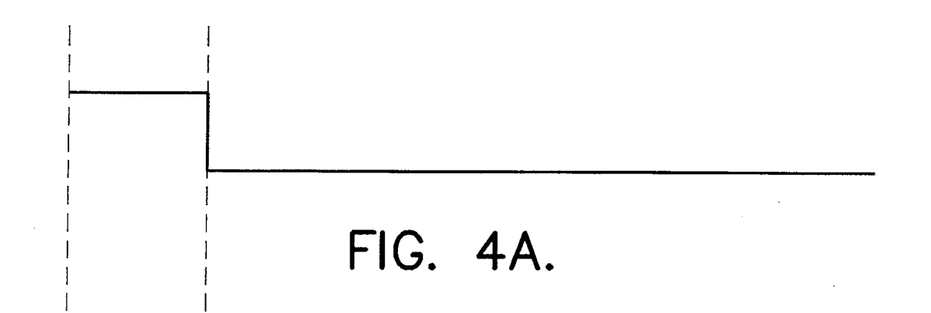
FIGS. 4A through 4E are waveform diagrams useful in illustrating the phase locking and clock selection operation of FIGS. 1A, 1B, 2, and 3.
Figure 4B:
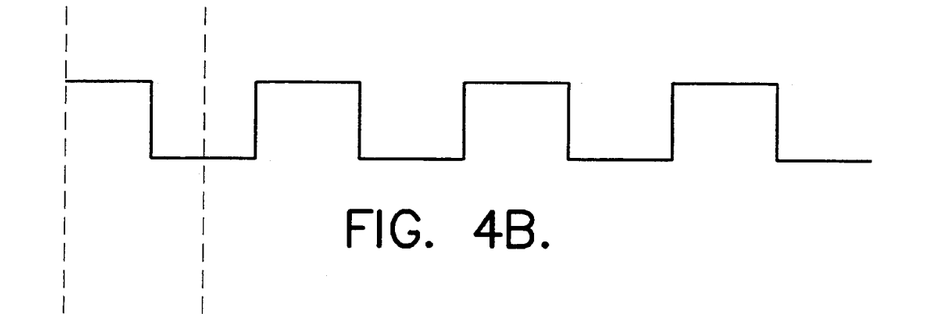
Figure 4C:
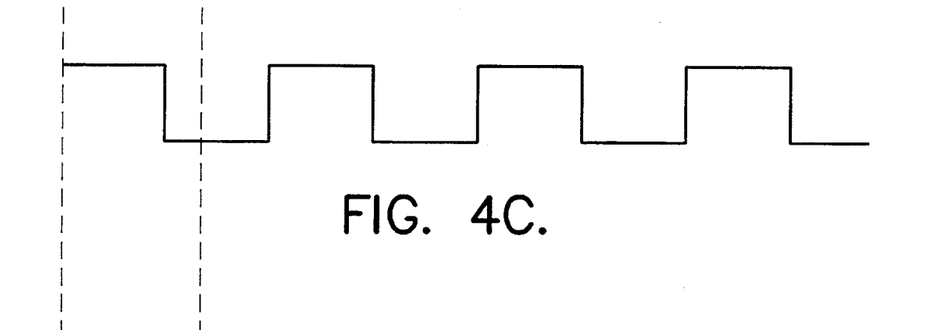
Figure 4D:
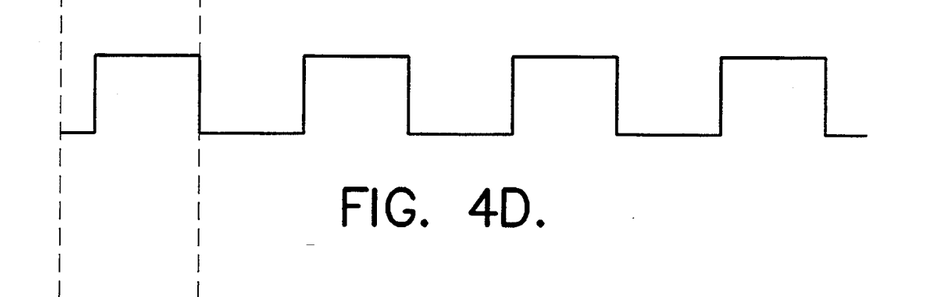
Figure 4E:
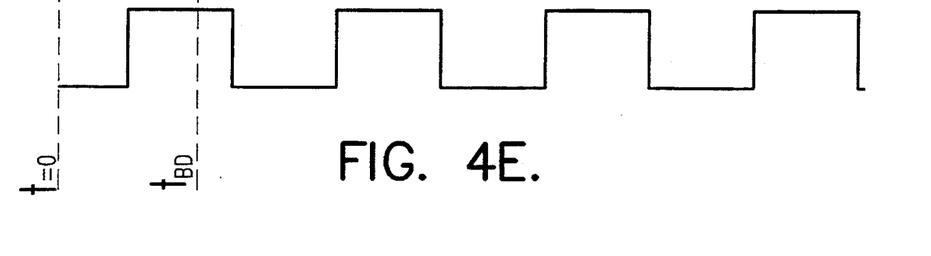

Referring now to FIGS. 4A through 4E to better illustrate the above phase matching operation of the clock generator circuitry of FIG. 3, the beam detect signal in FIG. 4A is shown as switching at a time $t_{BD}$, and the clock generator circuit 32 operates to take a snapshot of the CLK1 signal in FIG. 4B, the CLK2 signal in 4C, the CLK3 signal in FIG. 4D and the CLK4 signal in FIG. 4E, and so on so until the snapshot latch circuit first sees a match between the clock signal in FIG. 4D with the phase of the beam detect signal in FIG. 4A. Then the clock generator 32 operates in a manner described above to thereby generate an appropriate phase change signal on one of the output lines 116, 118, 120, 122, and 124 from the differentiator and selection encoder circuitry 46.

Various modifications may be made in and to the above described preferred embodiment without departing from the spirit and scope of this invention. For example, various circuit type modifications may be made in FIG. 3 while still retaining the steps and means broadly recited in the appended claims. Accordingly, such variations are clearly within the scope of the following appended claims.

I claim:

1. An electrographic printer comprising:
   a. means for generating a beam detect signal indicative of the location of a laser beam scanned by an electrophotographic print engine,
   b. means connected to said generating means for utilizing said beam detect signal to in turn generate a clock signal of a given frequency and of substantially the same phase as said beam detect signal, further wherein said means for utilizing comprises:
      (I) means for delaying an asynchronous clock signal a given number of times to produce a plurality of delayed clock signals differing in phase, said delaying means including a plurality of cascaded inverter stages connected to receive a signal from asynchronous clock for thereby generating a plurality of variably delayed clock signals, and latch means connected to receive both said beam detect signal and said delayed clock signals from said plurality of inverter stages,
      (ii) means connected to said delaying means for comparing said beam detect signal to said plurality of delayed clock signals,
      (iii) means connected to said comparing means for selecting the delayed clock signal which is the closest to the phase of said beam detect signal, and (iv) means connected to said selecting means for controlling the scanning of said laser beam further including a differentiating circuit connected to the output of said latch means for providing a plurality of output signals and an output multiplexing circuit connected to receive said output signals from said differentiating circuit for generating bi-phase clock signals for controlling video information applied to said print engine, and c. means connected to said utilizing means for driving an electrophotographic print engine with said clock signal so that dots of data written on successive lines of a photoconductive drum are precisely placed with respect to each other.

2. A clock generator for producing CLOCK and $\overline{\text{CLOCK}}$ bi-phase output timing signals for use in controlling video data in an electrophotographic printer including, in combination:

a. a chain of serially connected inverters for receiving an input clock signal and generating a plurality of variably delayed clock signals, b. a snapshot latch stage having a plurality of bistable flip flops therein, each of which are connected to receive a beam detect signal and a different variably delayed clock signal from one of said inverters, c. a differentiator stage connected to said flip flops in said snapshot latch stage and operative to generate output signals indicative of the phase of said beam detect signal, and d. an output multiplexer stage connected to said differentiator stage and operative for comparing said output signals with a selected one of said variably delayed clock signals in said chain of serially connected inverters and generating said bi-phase clock signals, whereby said selected one clock signal is closest in phase to the phase of said beam detect signal.

3. The clock generator defined in claim 2 wherein said differentiator stage includes a plurality of series connected AND gates and a plurality of parallel connected AND gates, each connected respectively in series and parallel pairs to each flip flop in said snapshot latch stage and each connected to a phase detector which in turn is connected to said chain of inverters, whereby one of said pairs of AND gates selects a flip flop in said snapshot latch which is opposite in phase to a phase detected output signal from said phase detector.

4. The clock generator defined in claim 3 wherein said output multiplexer stage comprises a plurality of parallel connected AND gates, each connected at one input to an AND gate output line from said differentiator stage and a different delayed output clock line from said chain of inverters, whereby a single output signal from said differentiator stage enables one of said parallel connected AND gates in said multiplexer stage shortly after the occurrence of said beam detect signal, thereby allowing the passing of a delayed clock signal on another input line to said one parallel connected AND gate.

5. The clock generator defined in claim 4 wherein said parallel connected AND gates in said multiplexer output stage are connected through an output OR gate and to CLOCK and $\overline{\text{CLOCK}}$ output lines.

* * * * *